April 27, 1954
K. W. NEBEL
2,676,656
CABLE CUTTING SHEARS
Filed Jan. 9, 1950
2 Sheets-Sheet 1
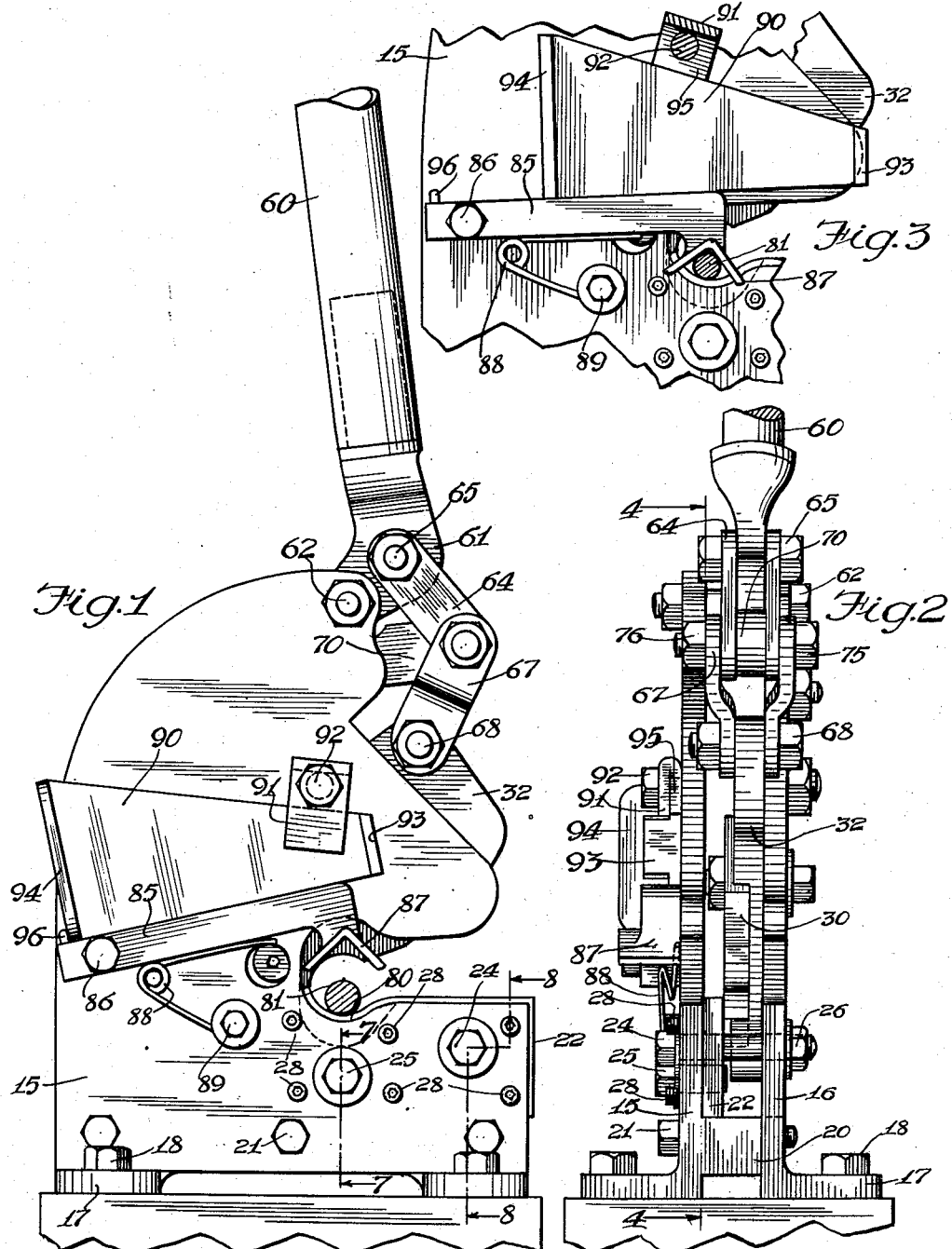
INVENTOR:
Kurt W. Nebel
BY
Stevens & Batchelder
Attorneys.

April 27, 1954
K. W. NEBEL
2,676,656
CABLE CUTTING SHEARS
Filed Jan. 9, 1950
2 Sheets-Sheet 2
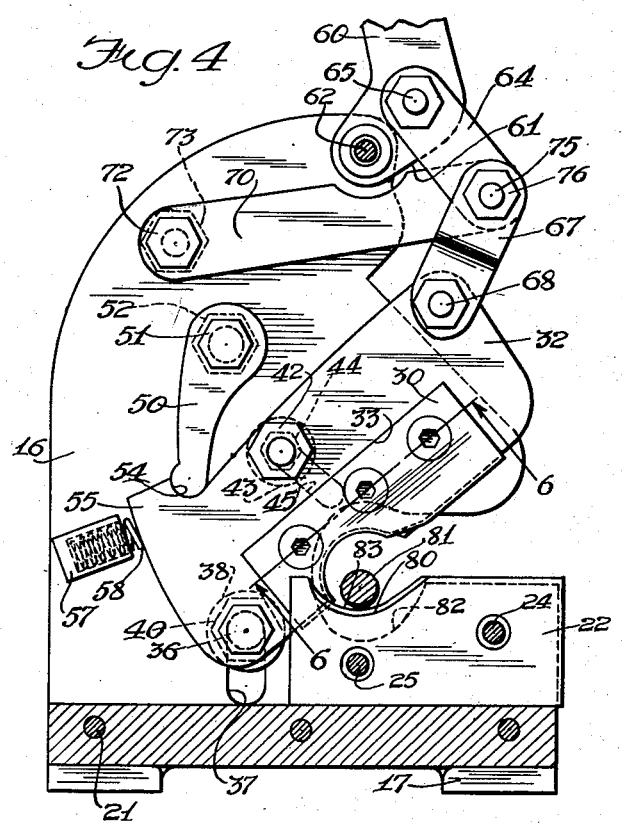
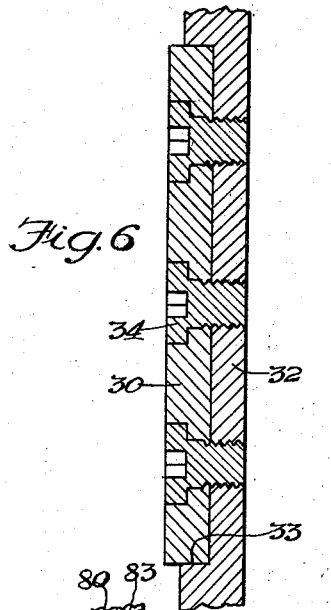
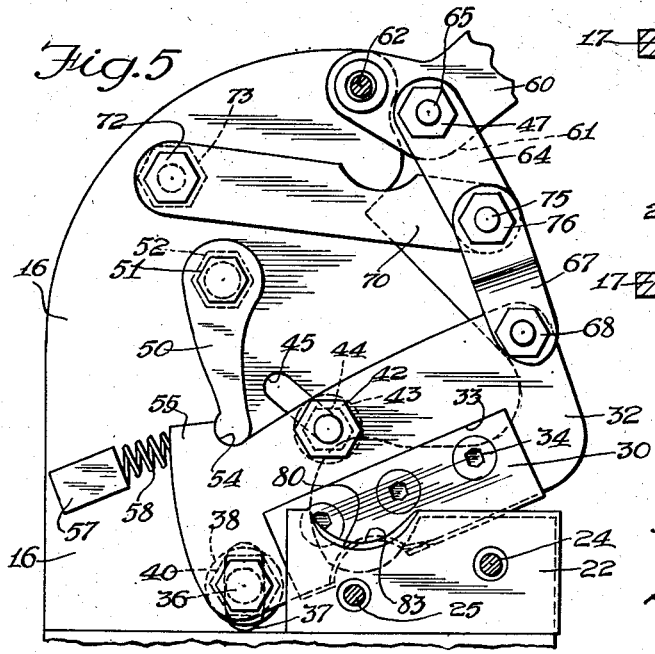
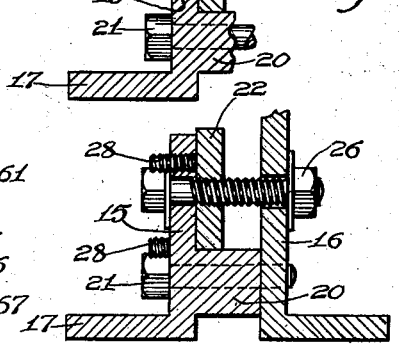
INVENTOR.
Kurt W. Nebel
BY
Stevens & Batchelder
Attorneys.

Patented Apr. 27, 1954

2,676,656

UNITED STATES PATENT OFFICE 2,676,656

CABLE CUTTING SHEARS

Kurt W. Nebel, Chicago, Ill.

Application January 9, 1950, Serial No. 137,579

9 Claims. (Cl. 164—44)

1

My invention relates to hand operated shears, such as are used in sheet metal and machine shops, and one object is to provide a shear of this type which is constructed in a manner to cut various types of cables, such as insulating cable, B–X electric cable, aluminum cable, etc., with facility.

A further object is to construct a shear of this kind ostensibly as a hand operated shear, but designed to negotiate work usually cut by power shears.

A still further object is to construct the novel shear with a cutting medium which undergoes a rolling action designed to impose an arcuate cut on the cable.

An additional object is to include in the novel shear a connecting linkage which translates the manual effort to operate the shear into a powerful cutting stroke.

Another object is to include in the novel shear an effective and quickly controlled hold-down device.

An important object is to assemble the novel shear in a manner to make it sturdy and compact.

With the above objects in view, and any others which may suggest themselves from the description to follow, a better understanding of the invention may be had by reference to the accompanying drawings, in which—

Fig. 1 is a side elevation of the shear in the idle position;

Fig. 2 is a front elevation as seen from the right-hand side of Fig. 1;

Fig. 3 is a duplication of the medial portion of Fig. 1, showing the hold-down device in operation;

Fig. 4 is a section on the line 4—4 of Fig. 2;

Fig. 5 is a view similar to Fig. 4, showing the position of the parts of the shear after a cutting stroke has been accomplished;

Fig. 6 is an enlarged section on the line 6—6 of Fig. 4; and

Figs. 7 and 8 are, respectively, sections on the lines 7—7 and 8—8 of Fig. 1.

In accordance with the foregoing, specific reference to the drawings indicates the body of the shear as a pair of massive upstanding plates 15 and 16, these being similar in form and spaced laterally. The plates have outwardly directed feet 17 at the front and rear, such feet being made with perforations for the application of bolts 18 or other suitable means to fasten the shear on a support such as a table or bench, portions of the plates occurring between the feet being slight-

2 ly elevated from such support. The plate 15 is formed with an inward enlargement 20 near the bottom which extends to the plate 16 and fixes the spacing between the plates; and these are bound together through the enlargement by a series of bolts 21.

While the body plates 15 and 16 of the shear serve primarily as supports, the plate 15 also serves as a carrier for the stationary blade 22 of the shear. Thus, Figs. 1 and 8 show that a pair of cross-bolts 24 and 25 are passed through the plates 15 and 16, and threaded through the stationary blade 22 as indicated in Fig. 8, the bolts receiving securing nuts 26 on the outer side of the plate 16. The rotation of the bolts 24 and 25 secures the lateral travel of the blade 22 to the desired position; and a series of set screws 28 entering the plate 15 is then employed to bear against the blade 22 and fix it in the position to which it has been laterally adjusted.

The upper or cutting blade of the shear is indicated at 30, and it is fastened alongside a massive plate 32 which may be called the upper blade holder. Fig. 6 shows that the blade 30 is secured into a chambered portion 33 of the blade holder 32 by a longitudinal series of socket screws 34, these facilitating the easy removal of the blade in case of sharpening or other attention. The blade holder 32 is pivoted at the rear on a cross-bolt 36 which passes outwardly through a substantially vertical slot 37 in the body plate 16 to receive a washer 38 and securing nut 40. The motion of the blade holder 32 is guided by a second cross-bolt 42 similar to the cross-bolt 36 and also receiving a washer 43 and a securing nut 44 on the outer side of the body plate 16. The bolt 42 is designed to travel in an oblique slot 45 made in the plate 16, the slot being inclined toward the front at an angle in the vicinity of 45°.

A detent 50 is pivotally attached with its upper end on the inner side of the plate 16, such detent being pivotable on a cross-bolt 51 which extends to the outer side of the plate 16 to receive a securing nut 52. The detent tapers toward its lower end, and the latter is rounded in a manner to fit a pocket 54 made between the upper edge of the blade holder 32 and an upward heel 55 formed at the rear end thereof. A block 57 is carried by the plate 16 opposite the rear edge of the blade holder 32, the block carrying a projecting coil spring 58. Thus, when the shear is in the idle position—as shown in Fig. 4—the blade holder bears against the spring 58 with a compressing influence. However, when the shear takes a cutting stroke, the blade holder 32 departs from the spring 58 to leave the same free, as shown in Fig. 5.

The shear is operated by a hand lever 60 which has an angular base 61 directed rearwardly. Thus, the terminal portion of the base is pivoted on a cross-bolt 62 passing between the body plates 15 and 16; and a pair of parallel links 64 are located with their upper end portions alongside the handle base 61, being pivoted to such base on a cross-bolt 65. A pair of links 67 similar to the links 64 are pivoted with their lower ends to the upper portion of the blade holder 32 on a cross-bolt 68; and the links 67 are expanded to overlap the lower end portions of the links 64 as shown in Figs. 1 and 2.

A sturdy arm 70 having a generally horizontal course is disposed in the space between the upper portions of the body plates 15 and 16. Thus, the rear end portion of the arm 70 is pivoted on a bolt 72 which passes through the arm and the plate 16 to receive a securing nut 73; and the forward end portion of the arm 70 lies between the lower end portions of the links 64. The joint of the arm 70 with the links 64 and 67 is intersected by a pivotal bolt 75, which receives a securing nut 76.

Figs. 1 and 4 indicate the idle position of the shear, in which case the hand lever 60 is poised in a substantially vertical position. Thus, through its linked connection to the blade holder 32, the lever serves to support the blade holder at a relatively steep angle from the front; and the blade holder is also supported at the rear by the slot 45, which prevents the downward arcuate travel of the bolt 42 about the pivot 68 of the blade holder. Therefore, the bottom bolt 36 of the latter is maintained high, or in the upper end of the slot 37. At the same time, the pressure of the spring 58 against the back of the blade holder causes it to maintain its firm relation in the regions of the pivots 68, 42 and 36, so that the lever 60 cannot of itself swing forward to be in the way in case the shear is jarred or its pivotal joints have worn free from extended use. In order to operate the shear, the hand lever 60 is drawn to swing in the clockwise direction as seen in Figs. 1 and 4, such swing being on the pivoting bolt 62. Initially, the angle of the links 64 furnishes a favorable leverage to the manual pull on the lever 60 to accomplish the down-swing of the pivot 75 and arm 70. The descent of the pivot 75 will bear directly through the links 67 on the cleaver-like blade holder 32; and the forward swing of the latter will draw forwardly on such links 67 to straighten them in relation to the links 64 on the descent of the blade holder, as shown in Fig. 5. The opening or straightening action of the link sets 64 and 67 creates a considerable power advantage between the hand lever 60 and the blade holder, so that the mere manual pull on the lever 60 procures a power stroke on the part of the blade holder 32 comparable to a power shear.

The body plate 15 is made with a curved pocket 80 for the deposit of the work 81; and the body plate 16 has a similar but lower pocket 82 to catch the severed portion of the work. The stationary shear blade 22 has a pocket 83 similar to, but higher than the pocket 80 of the plate 15. It is noted between Figs. 4 and 5 that the upper shear blade 30, while affording an ample clearance for the insertion or deposit of the work when the blade holder is in the poised position, descends past the intersecting point with the pocket 83 when the blade holder has accomplished its working stroke, as per Fig. 5. During this stroke, the detent 50 maintains a hold on the heel 55 of the blade holder while the latter assumes the forward travel afforded the bolt 42 by the slot 45. Thus, the pivotal descent of the blade 30 upon the work is accompanied by a forward motion, so that the cutting action is with an arcuate or wrapping movement tending to work through the cut rather than bite through the same. This action requires less power and accomplishes a cleaner cut.

A simple expedient is employed in the novel shear for holding the work down. Thus, Fig. 1 shows that a bar 85 is pivoted at its rear end on a bolt 86 to the outer side of the body plate 15, the bar extending forwardly to carry an angular work engaging jaw 87 at its front end. Normally, a torsion spring 88, anchored with one end to the plate 15 as indicated at 89 and bearing upwardly with its other end on the bar 85, serves to keep the jaw 87 high or in a position to clear the work. However, a cam plate 90 is mounted over the bar 85 in a position alongside the body plate 15, such cam plate being tapered forwardly from the top. The cam plate is slidably disposed relative to the bar 85 by being mounted within a retainer 91 bolted at 92 to the plate 15; and the cam plate has outward terminal flanges 93 and 94. After the work has been inserted in the pocket 80 of the shear, the flange 93 may be used as a handle to draw the cam plate 90 forwardly, in which event it will bear on the bar 85 to lower the jaw 87 into engagement with the work. In this manner, the said jaw may be influenced to clamp the work firmly; and the jaw will be locked in the clamped position by the engagement of the cam plate 90 with the base 95 of the retainer 91, the parts described now appearing as in Fig. 3. It is understood now that the simple retraction of the cam plate 90 will quickly release the work; and a rear limit for the cam plate is formed when the rear flange 94 thereof meets a stop pin 96 rising from the rear end of the bar 85.

It will now be evident that the novel shear incorporates a number of features which make it a highly efficient appliance. Thus, its sturdy nature enables it to be built compactly while retaining the necessary strength and durability for the work required of it. Further, the linkage between the hand lever and the upper blade holder is of a nature to translate comparatively light manual effort into considerable power, so that work usually negotiated by power shears may be handled by the present hand shear. Further, the disposal of the upper blade is such as to impose a partly sliding or rolling action during the cut, whereby to lessen the force necessary to accomplish the same. Further, a hold-down service is provided which is simple and positive in its action, yet quickly releasable. Finally, the construction of the shear involves few and simple parts, whereby to enable the shear to be produced at reasonable cost.

While I have described the invention along specific lines, various minor changes or refinements may be made therein without departing from its principle, and I reserve the right to employ all such changes and refinements as may come within the scope and spirit of the appended claims.

I claim:

1. A cable cutting shear comprising a pair of laterally spaced body plates, a lower blade disposed between the body plates, an upper blade holder located between the body plates, an upper blade carried by the said holder, manually operated means to lower the upper blade holder with the effect of accomplishing a shearing movement between the upper blade and the lower one, the rear portion of said holder being pivoted in one of said plates at the bottom, a cross-bolt carried by said holder at a medial point, and one of said plates having a forwardly inclined slot receiving the cross-bolt in its upper end when said holder is in its initial position, said slot allowing lateral leeway for the pivoting movement of the holder on the downward stroke.

2. A cable cutting shear comprising a pair of laterally spaced body plates, a lower blade disposed between the body plates, an upper blade holder located between the body plates, an upper blade carried by the said holder, manually operated means to lower the upper blade holder with the effect of accomplishing a shearing movement between the upper blade and the lower one, the rear portion of said holder being pivoted in one of said plates at the bottom with downward leeway, means at the intermediate portion of said holder to guide it in forward direction during its downward swing, and means at the rear of the holder checking the rise thereof during said swing.

3. A cable cutting shear comprising a pair of laterally spaced body plates, a lower blade disposed between the body plates, an upper blade holder located between the body plates, an upper blade carried by the said holder, manually operated means to lower the upper blade holder with the effect of accomplishing a shearing movement between the upper blade and the lower one, the rear portion of said holder being pivoted in one of said plates at the bottom with downward leeway, means at the intermediate portion of said holder to guide it in forward direction during its downward swing, and means at the rear of the holder checking the rise thereof during said swing, said means comprising a detent carried by one of the body plates and directed to said rear portion.

4. A cable cutting shear comprising a pair of laterally spaced body plates, a lower blade disposed between the body plates, an upper blade holder located between the body plates, an upper blade carried by the said holder, manually operated means to lower the upper blade holder with the effect of accomplishing a shearing movement between the upper blade and the lower one, the rear portion of said holder being pivoted in one of said plates at the bottom with downward leeway, means at the intermediate portion of said holder to guide it in forward direction during its downward swing, and means at the rear of the holder checking the rise thereof during said swing, said means comprising a detent carried by one of the body plates and directed into a pocket formed by an upward heel extended from said portion.

5. A cable-cutting appliance or the like comprising a support member, separate cooperating and relatively movable cutting blade members carried by said support member, means mounting at least one of said blade members for combined swinging and bodily sliding movement toward the other blade member and to cooperative work-cutting engagement therewith, lever means operatively connected to said support and first-mentioned blade member to actuate the latter, one of said first-mentioned blade and base members having a guide groove inclined toward the other blade member, the other of said first-mentioned blade and base members having a projection extending into said guide groove whereby to guide said blade member into cooperative engagement with the other blade member and the work, support member-carried spring means acting against said first-mentioned blade member in a direction to tend to maintain said blade member at the remote limit of its bodily sliding movement away from the other blade member when the appliance is in its non-operating position and to tend to sustain the weight of said lever means in said position, and a swingable detent carried by said base member and engaging said first-mentioned blade member in all positions of the latter, said detent preventing said first-mentioned blade member from sliding bodily away from the work and companion cutter member when the lever means is being operated.

6. A cable-cutting appliance or the like comprising a support member, separate cooperating and relatively movable cutting blade members carried by said support member, means mounting at least one of said blade members for combined swing and bodily sliding movement toward the other blade member and to cooperative work-cutting engagement therewith, lever means operatively connected to said support and first-mentioned blade member to actuate the same, one of said first-mentioned blade and base members having a guide groove inclined toward the other blade member, the other of said first-mentioned blade and base members having a projection extending into said guide groove whereby to guide said blade member into cooperative engagement with the other blade member and the work, and support member-carried spring means acting against said first-mentioned blade member in a direction to tend to maintain said blade member at the remote limit of its bodily sliding movement away from the other blade member when the appliance is in its non-operating position and to tend to sustain the weight of said lever means in said position.

7. A cable-cutting appliance or the like comprising a support member, separate cooperating and relatively movable cutting blade members carried by said support member, means mounting at least one of said blade members for combined swinging and bodily sliding movement toward the other blade member and to cooperative work-cutting engagement therewith, lever means operatively connected to said support and first-mentioned blade member to actuate the same, and a swingable detent carried by said base member and engaging said first-mentioned blade member in all positions of the latter, said detent preventing said first-mentioned blade member from sliding bodily away from the work and companion cutter member when the lever means is being operated.

8. A cable-cutting appliance or the like comprising a support member, separate cooperating and relatively movable cutting blade members carried by said support member, means mounting at least one of said blade members for combined swinging and bodily sliding movement toward the other blade member and to cooperative work-cutting engagement therewith, means operatively connected to said support and first-mentioned blade member to actuate the latter to operative cutting relationship with the other blade member with the effect of accomplishing a shearing movement between the first-mentioned blade member and the second-mentioned blade member, and yielding means carried by said support member and engaging said first-mentioned blade member in a direction to tend to maintain the latter at the remote limit of its bodily back sliding movement along the other blade member when the appliance is in its non-operating position.

9. A cable-cutting appliance or the like comprising a support member, separate cooperating and relatively movable cutting blade members carried by said support member, means mounting at least one of said blade members for combined swinging and bodily sliding movement toward the other blade member and to cooperative work-cutting engagement therewith, means operatively connected to said support and first-mentioned blade member to actuate the latter to operative cutting relationship with the other blade member with the effect of accomplishing a shearing movement between the first-mentioned blade member and the second-mentioned blade member, support member-carried means operatively engaging said first-mentioned blade member to prevent bodily sliding movement of the latter away from the other blade member during the operation of cutting a piece of work, and yielding means carried by said support member and engaging said first-mentioned blade member in a direction to tend to maintain the latter at the remote back limit of its bodily sliding movement along the other blade member when the appliance is in its non-operating position.

References Cited in the file of this patent

UNITED STATES PATENTS

| Number | Name | Date |
|---|---|---|
| 529,639 | Autrey | Nov. 20, 1894 |
| 710,310 | Wesselmann | Sept. 30, 1902 |
| 786,592 | Ohl | Apr. 4, 1905 |
| 989,824 | Swan | Apr. 18, 1911 |
| 1,137,093 | Simonsen | Apr. 27, 1915 |
| 1,565,654 | Laukhuff | Dec. 15, 1925 |
| 1,700,174 | McMillan | Jan. 29, 1929 |
| 2,477,295 | Garwood | July 26, 1949 |

FOREIGN PATENTS

| Number | Country | Date |
|---|---|---|
| 62,057 | Germany | May 7, 1892 |
| 19,153 | Great Britain | Sept. 1, 1902 |